United States Patent
Cook et al.

(10) Patent No.: US 10,320,957 B2
(45) Date of Patent: Jun. 11, 2019

(54) INCREASING DATA RESILIENCY OPERATIONS BASED ON IDENTIFYING BOTTLENECK OPERATORS

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 15/254,129

(22) Filed: Sep. 1, 2016

(65) Prior Publication Data

US 2018/0063210 A1    Mar. 1, 2018

(51) Int. Cl.
*H04L 29/06* (2006.01)
*G06F 15/16* (2006.01)
*G06F 16/00* (2019.01)

(52) U.S. Cl.
CPC ............ *H04L 69/22* (2013.01); *G06F 15/16* (2013.01); *G06F 16/00* (2019.01)

(58) Field of Classification Search
None
See application file for complete search history.

(56) References Cited

U.S. PATENT DOCUMENTS

| 8,276,035 | B1 | 9/2012 | Savarese et al. |
| 9,015,289 | B2 | 4/2015 | Tseitlin et al. |
| 2016/0105476 | A1 | 4/2016 | Weber |

OTHER PUBLICATIONS

Locher et al., "Resilient Task Allocation Mechanism for Stream Processing Applications", ip.com, An IP.com Prior Art Database Technical Disclosure, IP.com No. IPCOM000242806D, IP.com Electronic Publication Date: Aug. 19, 2015, Copyright: ABB Schweiz AG, 7 pages.

Handman, "Design of Piping Systems", ip.com, An IP.com Prior Art Database Technical Disclosure, 2012, KBR (Kellogg Brown & Root, LLC), IP.com No. IPCOM000221700D, IP.com Electronic Publication Date: Sep. 15, 2012, 60 pages.

*Primary Examiner* — Craig C Dorais

(74) *Attorney, Agent, or Firm* — Daniel C. Housley

(57) ABSTRACT

A streaming application processes data by processing tuples via operators. Bottleneck operators are identified. A degree of streaming speed is maintained, even when non-bottleneck operators participate in increased resiliency operations.

20 Claims, 7 Drawing Sheets

INCREASING DATA RESILIENCY OPERATIONS BASED ON IDENTIFYING BOTTLENECK OPERATORS

BACKGROUND

The present disclosure relates to stream computing and more specifically, to increasing data resiliency operations based on identifying bottleneck operators associated with a streaming application.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

According to embodiments of the present disclosure, a method, computer program product, and system are disclosed for processing a plurality of streams of tuples. In various embodiments, the method may include receiving a stream of tuples to be processed by a plurality of processing elements operating on one or more computer processors, each processing element including one or more stream operators, wherein one or more of the stream operators include code configured to output tuples to one or more other stream operators. A set of operators associated with a stream application are identified. At least one bottleneck operator within the set of operators associated with the stream application is identified. A first set of operators, the first set of operators being exclusive of the at least one bottleneck operator, is identified. Data resiliency operations for the first set of operators is increased.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
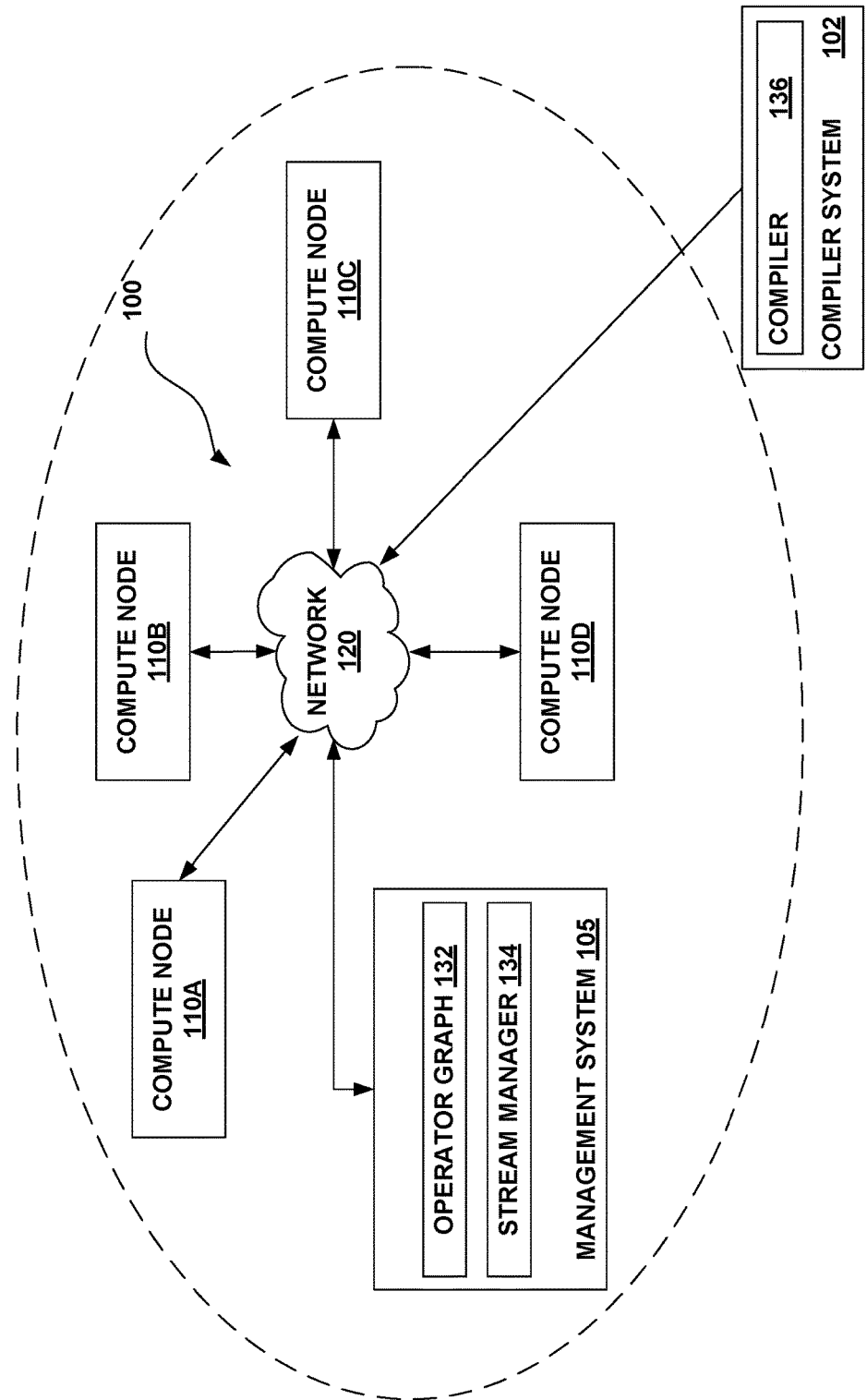
FIG. 1 illustrates a computing infrastructure that may be configured to execute a stream-based computing application, according to some embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to stream computing, more particular aspects relate to increasing data resiliency operations based on identifying bottleneck operators of a streaming application. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In streaming applications, scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using interprocess communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

In various embodiments, data loss among operators associated with a streaming application may be managed to maintain a degree of speed of processing, even while increasing resiliency. In some embodiments, the speed of the application may not be impacted. Bottleneck operators may be identified, for example, by determining which operator(s) have the slowest tuple processing rate, the slowest data processing rate, etc. For example, bottleneck operators may be determined in real-time or by user input via an interactive user interface. In yet other embodiments, bottleneck operators may be determined by estimating the processing capabilities of the operators associated with the streaming application, and using that information to determine which operator(s) are most likely to cause a bottleneck condition within the stream.

Once bottleneck operators are identified, the non-bottleneck operators associated with the stream may be grouped into one or more sets of operators to participate in increased resiliency operations. For example, non-bottleneck operators may routinely output any number of redundant tuples to prevent data loss. In other embodiments, the set of non-bottleneck operators may output redundant tuples into a buffer. The furthest downstream operator in the set of non-bottleneck operators may compare a table of received data and/or tuples to a table of the furthest upstream operator's sent data and/or tuples. Upon discovery of a lost tuple or lost data within a tuple, the application may cause an operator upstream from the data loss event to send redundant tuples containing the lost data from the buffer. In embodiments, the application may constantly monitor the operators and dynamically identify bottleneck operators to ensure that bottleneck operators are performing at their maximum processing rate, while non-bottleneck operators participate in increased resiliency programs to ensure resiliency of the application, thus maintaining the speed of the overall application.

In various embodiments, there may be any number of bottleneck operators and any number of sets of non-bottleneck operators.

Turning now to the figures, FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120. The management system 105 may include an operator graph 132 and a stream manager 134.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
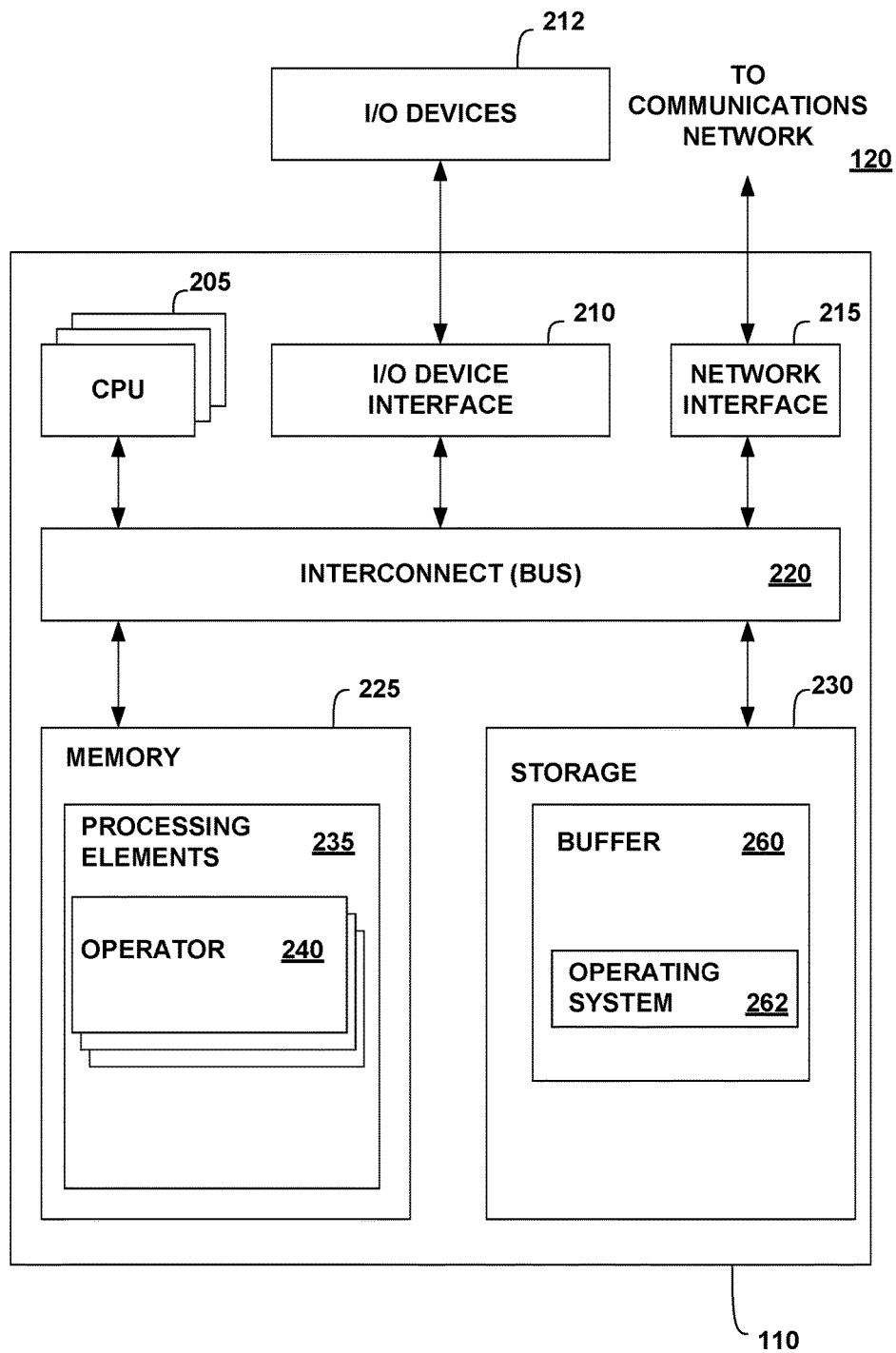
FIG. 2 is a more detailed view of a compute node 110, which may be the same as one of the compute nodes 110A-110D of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
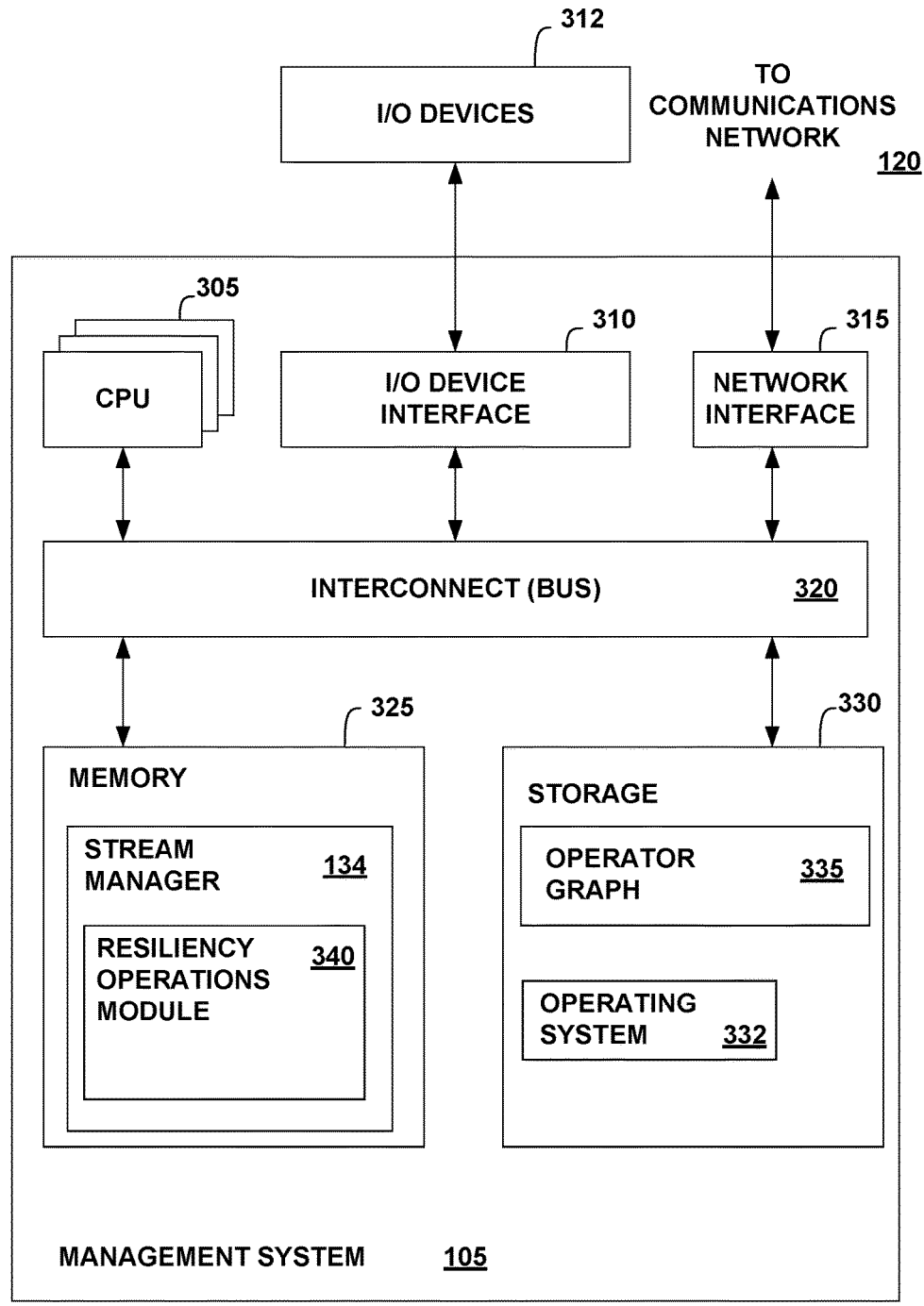
FIG. 3 is a more detailed view of the management system 105 of FIG. 1 according to some embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134, which may include a resiliency operations module 340. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

The resiliency operations module 340 may be, for example, a computer module with executable program instructions thereon for increasing the resiliency of a streaming application. Resiliency operations may include, but are not limited to those operations discussed herein. For example, non-bottleneck operators may routinely output any number of redundant tuples to prevent data loss. In other embodiments, the set of non-bottleneck operators may output tuples into a buffer. The furthest downstream operator in the set of non-bottleneck operators may compare a table of received data and/or tuples to a table of the furthest upstream operator's sent data and/or tuples. Upon discovery of a lost tuple or lost data within a tuple, the application may cause an operator upstream from the data loss event to send redundant tuples containing the lost data from the buffer. In embodiments, the application may constantly monitor the operators and dynamically identify bottleneck operators to ensure that bottleneck operators are performing at their maximum processing rate, while non-bottleneck operators participate in increased resiliency programs to ensure resiliency of the application while maintaining a degree of speed in the overall application. The resiliency operations module 340 may exist, if at all, across a plurality of devices. For example, the resiliency operations module 340 may be implemented partially as a component of the stream manager 134 and partially as a component of the operator graph 335. In embodiments, the resiliency operations module 340 may exist as a stand-alone component in the management system 105.

Figure 4:
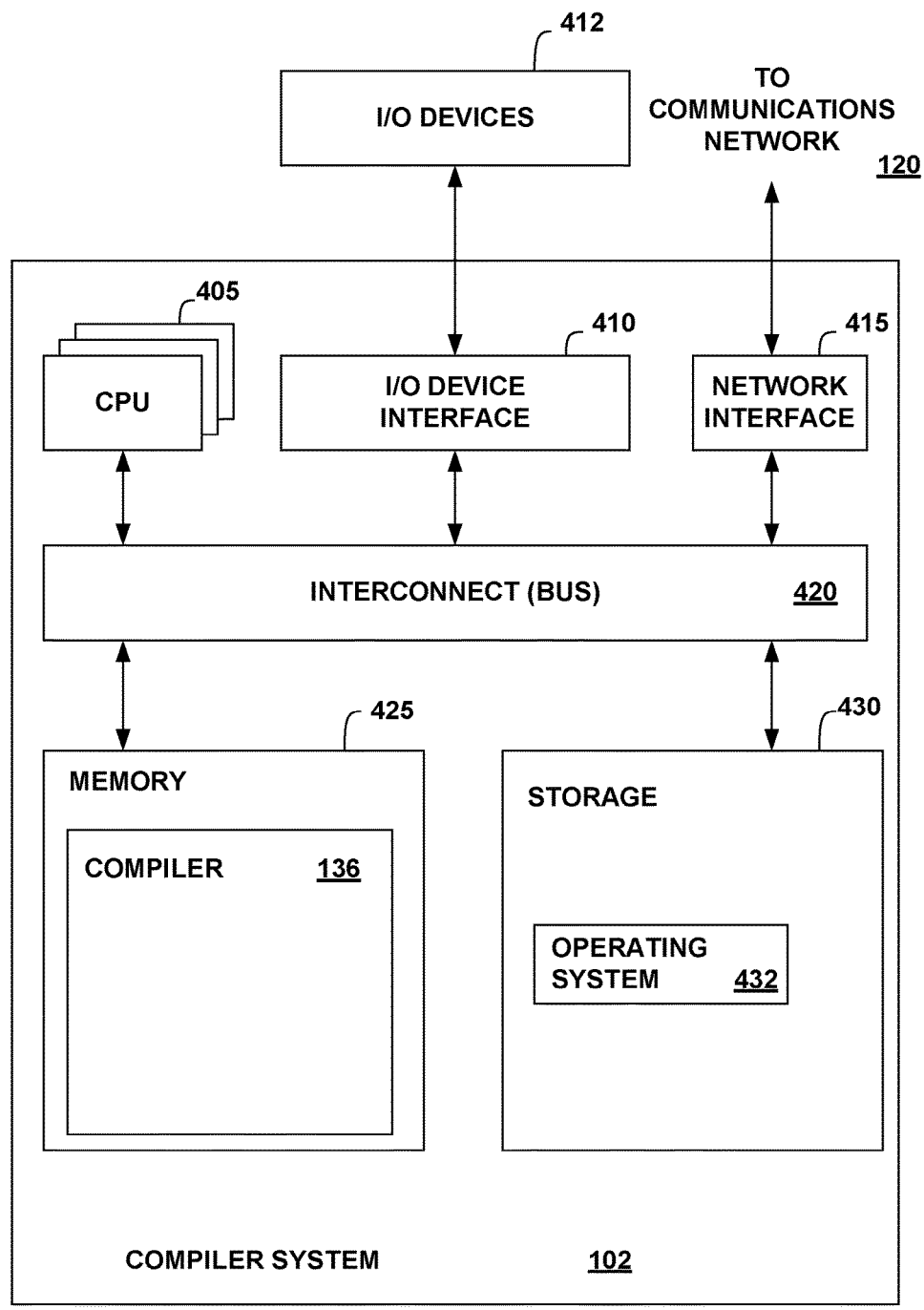
FIG. 4 is a more detailed view of the compiler system 102 of FIG. 1 according to some embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
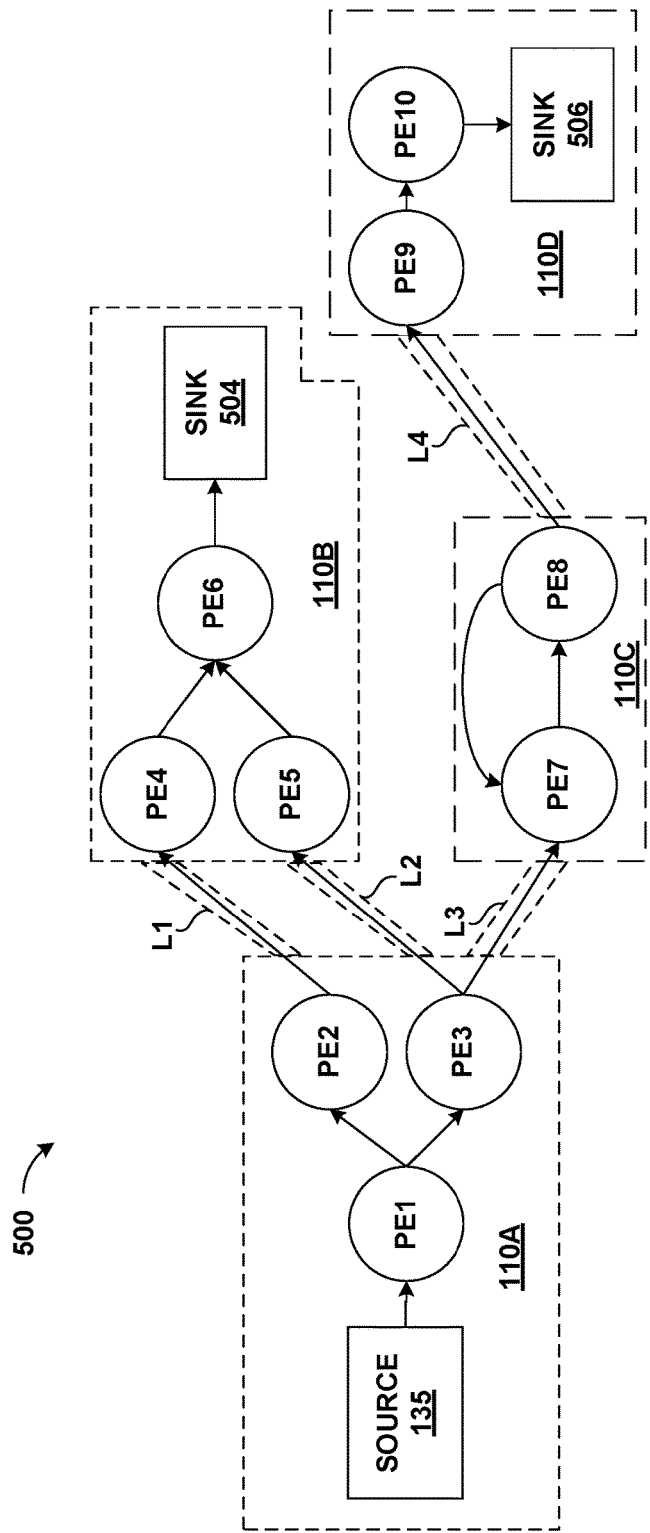
FIG. 5 illustrates an exemplary operator graph for a stream computing application beginning from one or more sources through to one or more sinks, according to some embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory, and may be represented here by L1-L4. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
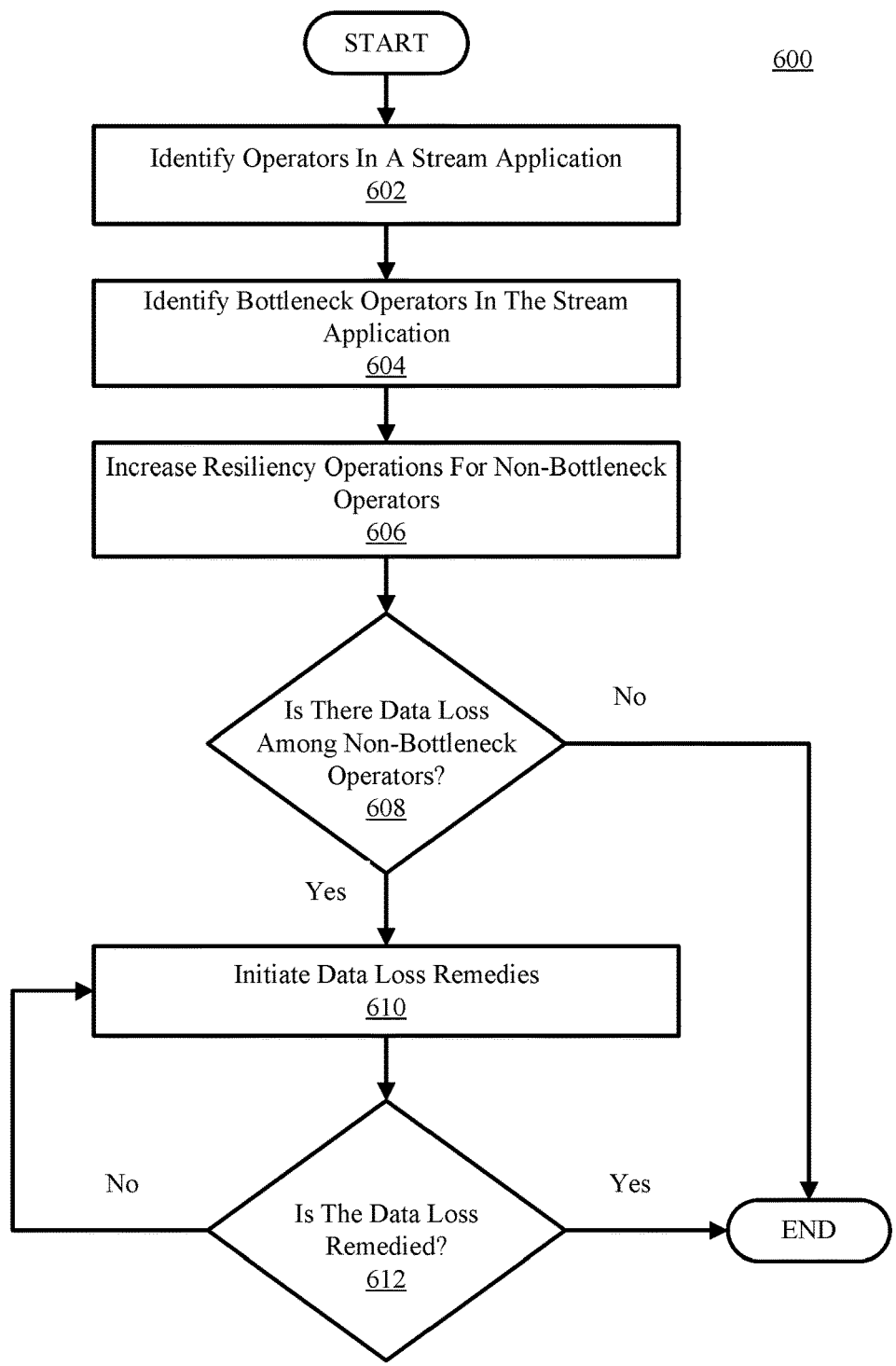
FIG. 6 depicts a method for increasing data resiliency operations based on identifying bottleneck operators of a streaming application, according to embodiments.

FIG. 6 depicts a method for increasing data resiliency operations based on identifying bottleneck operators of a streaming application, according to embodiments, in a processing environment 600. At 602, the operators associated with a stream application are identified. For example, a streams computing system with operators A-Z, where operators A, C, K, L, and Q are identified as being associated with Application X.

At 604, bottleneck operators in the stream application are identified. For example, operator K may be identified as the bottleneck operator. The identification of the bottleneck operator may be based, for example, on slowest tuple processing rate, by user selection, by real-time evaluation of operator processing rates, by predictive estimation of the operator most likely to have the slowest tuple processing rate, by collective evaluation of processing elements containing one or more operators, or by any other means of streaming application speed evaluation.

At 606, resiliency operations for non-bottleneck operators are increased. For example, a buffer of the tuples processed by non-bottleneck operators may be created and maintained. For example, in a streaming application associated with operators, in streaming order, A, C, E, J, L, R, T, and V, where operator L is identified as a bottleneck operator, one or more buffers covering any length of time may be employed to buffer tuples processed by the non-bottleneck operators. For example, Buffer 1 may be configured to buffer the tuples processed by operators A, C, E, and J for a ten-second interval. Buffer 2 may be configured to buffer the tuples processed by operators R, T, and V for a twenty-second interval.

At 608, it is determined whether there is any data loss among the non-bottleneck operators. For example, the data and/or tuples processed by an operator, for example, operator V, may be compared the data and/or tuples processed by an upstream operator, for example, operator A. If no data or tuples have been lost, the query ends. In embodiments, the query may recur at any interval.

If, at 608, it is determined that data/tuple loss has occurred, data loss remedies are initiated at 610. For example, redundant tuples may be sent from a buffer to an operator upstream from where the data/tuple loss was detected. For example, if data/tuple loss is detected at operator J, a redundant tuple may be sent from Buffer 1 to operator A to maintain resiliency.

At 612, it is determined whether the data/tuple loss has been remedied. For example, the output of operator J may be monitored to ensure that the lost data/tuple is successfully processed. If, at 612, the data/tuple loss is determined to be remedied, the query may end. In embodiments, the query may recur at any interval.

In response to a determination, at 612, that the data/tuple loss has not been remedied, data loss remedies may again be initiated. For example, if, after sending a first redundant tuple, the data loss is not remedied, a second redundant tuple may be sent.

Figure 7:
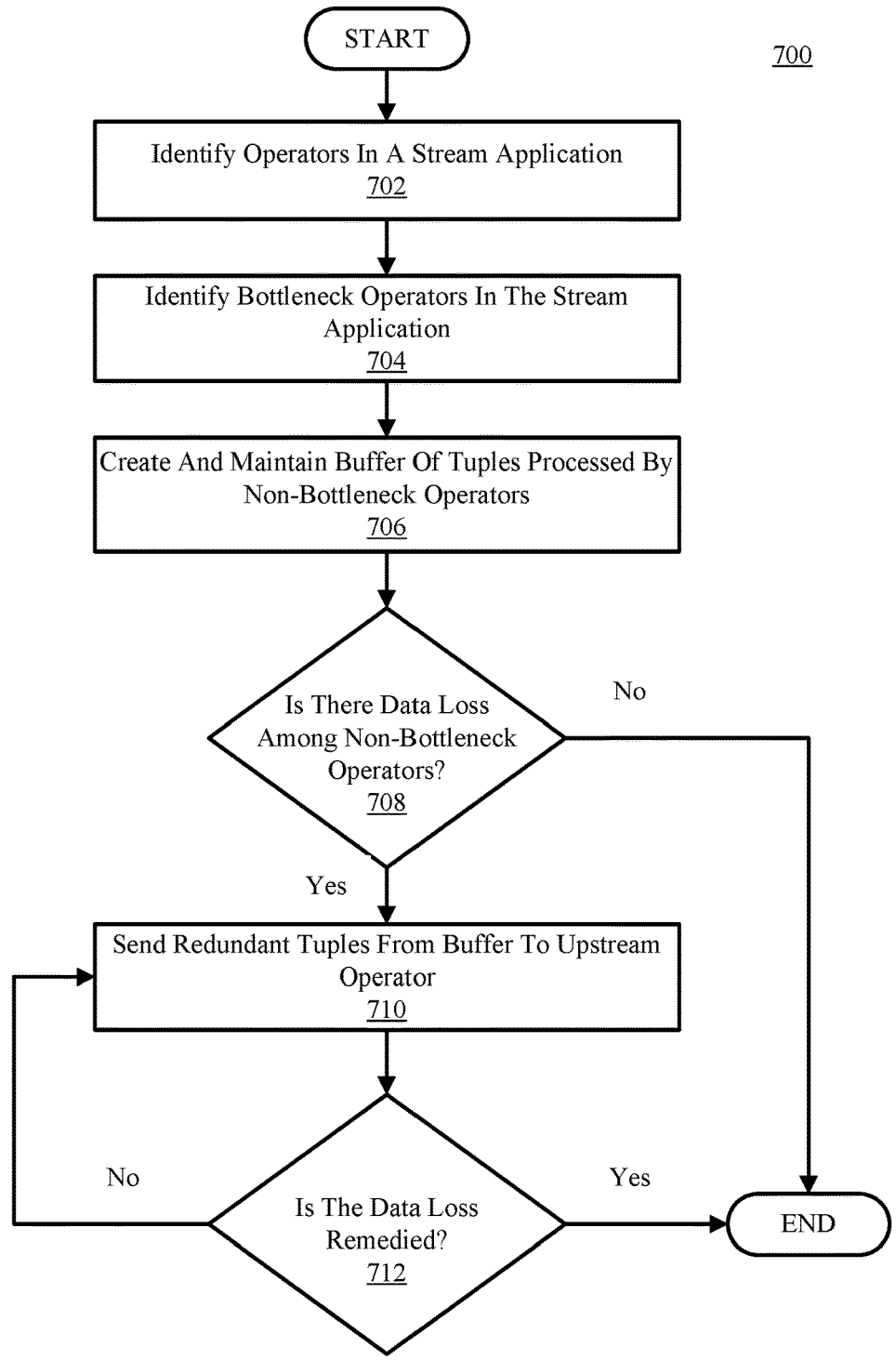
FIG. 7 depicts a method for increasing data resiliency operations based on identifying bottleneck operators of a streaming application and employing a tuple buffer, according to embodiments.

FIG. 7 depicts a method for increasing data resiliency operations based on identifying bottleneck operators of a streaming application and employing a tuple buffer, according to embodiments, in a processing environment 700. At 702, the operators associated with a stream application are identified. For example, a streams computing system with operators A-Z, where operators B, O, R, T, and Z are identified as being associated with Application Y.

At 704, bottleneck operators in the stream application are identified. For example, operator T may be identified as the bottleneck operator. The identification of the bottleneck operator may be based, for example, on slowest tuple processing rate, by user selection, by real-time evaluation of operator processing rates, by predictive estimation of the operator most likely to have the slowest tuple processing rate, by collective evaluation of processing elements containing one or more operators, or by any other means of streaming application speed evaluation.

At 706, a buffer of tuples processed by the non-bottleneck operators is created and maintained. For example, in a streaming application associated with operators, in streaming order, D, F, G, M, S, U, X, and Z, where operator S is identified as a bottleneck operator, one or more buffers covering any length of time may be employed to buffer tuples processed by the non-bottleneck operators. For example, Buffer 1 may be configured to buffer the tuples processed by operators D, F, G, and M for a ten-second interval. Buffer 2 may be configured to buffer the tuples processed by operators U, X, and Z for a twenty-second interval.

At 708, it is determined whether there is any data loss among the non-bottleneck operators. For example, the data and/or tuples processed by an operator, for example, operator M, may be compared the data and/or tuples processed by an upstream operator, for example, operator D. If no data or tuples have been lost, the query ends. In embodiments, the query may recur at any interval.

If, at 708, it is determined that data/tuple loss has occurred, redundant tuple(s) is/are sent to an operator upstream of the data loss event at 710. For example, if data/tuple loss is detected at operator M, a redundant tuple may be sent from Buffer 1 to operator D to maintain resiliency.

At 712, it is determined whether the data/tuple loss has been remedied. For example, the output of operator Z may be monitored to ensure that the lost data/tuple is successfully processed. If, at 712, the data/tuple loss is determined to be remedied, the query may end. In embodiments, the query may recur at any interval.

In response to a determination, at 712, that the data/tuple loss has not been remedied, one or more redundant tuples may be sent again. For example, if, after sending a first redundant tuple to operator U, the data loss is not remedied, a second redundant tuple may be sent from Buffer 2 to operator U.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and a streams programming language, such as IBM Streams Processing Language (SPL). The program code may execute as specifically described herein. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer-implemented method for managing the speed and resiliency of a stream environment, the method comprising:
receiving a stream of tuples to be processed by a plurality of processing elements operating on one or more computer processors, each processing element including one or more stream operators, wherein one or more of the stream operators include code configured to output tuples to one or more other stream operators;
identifying a set of operators associated with a stream application;
identifying at least one bottleneck operator within the set of operators associated with the stream application, wherein the at least one bottleneck operator is associated with less than a full tuple within the stream of tuples;
identifying a first set of operators, the first set of operators being exclusive of the at least one bottleneck operator; and
increasing data resiliency operations for the first set of operators.

2. The method of claim 1, wherein the first set of operators is located upstream of the at least one bottleneck operator.

3. The method of claim 1, wherein the first set of operators is located downstream of the at least one bottleneck operator.

4. The method of claim 1, wherein the at least one bottleneck operator comprises a first bottleneck operator and a second bottleneck operator, and wherein the first set of operators is between the first bottleneck operator and the second bottleneck operator.

5. The method of claim 1, wherein identifying at least one bottleneck operator includes identifying the operator with the slowest tuple processing rate.

6. The method of claim 1, wherein identifying at least one bottleneck operator includes constant identification of the at least one bottleneck operator.

7. The method of claim 6, wherein constant identification of the at least one bottleneck operator includes real-time determination of the at least one bottleneck operator.

8. The method of claim 1, wherein identifying at least one bottleneck operator includes identifying a user determination of the at least one bottleneck operator.

9. The method of claim 8, wherein the user determination is received via a user interface.

10. The method of claim 1, wherein identifying at least one bottleneck operator includes estimating that a particular operator is most likely to be the at least one bottleneck operator.

11. The method of claim 1, wherein increasing data resiliency operations comprises:
maintaining a buffer of tuples processed in the first set of operators; and
in response to detecting data loss among the first set of operators, sending redundant tuples from the buffer of tuples.

12. A computer program product for processing a stream of tuples, the computer program product comprising a tangible computer readable storage medium having program code embodied therewith, the program code comprising computer readable program code configured to:

receive a stream of tuples to be processed by a plurality of processing elements operating on one or more computer processors, each processing element having one or more stream operators;

identify a set of operators associated with a stream application;

identify at least one bottleneck operator within the set of operators associated with the stream application, wherein the at least one bottleneck operator is associated with less than a full tuple within the stream of tuples;

identify a first set of operators, the first set of operators being exclusive of the at least one bottleneck operator; and increase data resiliency operations for the first set of operators.

13. The computer program product of claim 12, wherein identifying at least one bottleneck operator includes identifying the operator with the slowest tuple processing rate.

14. The computer program product of claim 12, wherein identifying at least one bottleneck operator includes constant identification of the at least one bottleneck operator.

15. The computer program product of claim 12, wherein identifying at least one bottleneck operator includes identifying a user determination of the at least one bottleneck operator.

16. The computer program product of claim 12, wherein increasing data resiliency operations comprises:

maintaining a buffer of tuples processed in the first set of operators; and in response to detecting data loss among the first set of operators, sending redundant tuples from the buffer of tuples.

17. A system for processing a stream of tuples, comprising:

a plurality of processing elements to receive a stream of tuples, each processing element including one or more stream operators, wherein one or more of the stream operators include code configured to output tuples to one or more other stream operators;

two or more processors; and a memory containing an application that, when executed, causes at least one of the two or more processors to:

identify a set of operators associated with a stream application;

identify at least one bottleneck operator within the set of operators associated with the stream application, wherein the at least one bottleneck operator is associated with less than a full tuple within the stream of tuples;

identify a first set of operators, the first set of operators being exclusive of the at least one bottleneck operator; and increase data resiliency operations for the first set of operators.

18. The system of claim 17, wherein identifying at least one bottleneck operator includes constant identification of the at least one bottleneck operator.

19. The system of claim 17, wherein identifying at least one bottleneck operator includes identifying a user determination of the at least one bottleneck operator.

20. The system of claim 17, wherein increasing data resiliency operations comprises:

maintaining a buffer of tuples processed in the first set of operators; and in response to detecting data loss among the first set of operators, sending redundant tuples from the buffer of tuples.

* * * * *